US009443090B2

(12) United States Patent
Harris et al.

(10) Patent No.: US 9,443,090 B2
(45) Date of Patent: *Sep. 13, 2016

(54) SYSTEM AND METHOD FOR TARGETED MESSAGING, WORKFLOW MANAGEMENT, AND DIGITAL RIGHTS MANAGEMENT FOR GEOFEEDS

(71) Applicant: Geofeedia, Inc., Naples, FL (US)

(72) Inventors: Philip B. Harris, Naples, FL (US); Scott K. Mitchell, Naples, FL (US); Michael J. Mulroy, Glencoe, IL (US)

(73) Assignee: Geofeedia, Inc., Naples, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/500,881

(22) Filed: Sep. 29, 2014

(65) Prior Publication Data

US 2015/0020208 A1    Jan. 15, 2015

Related U.S. Application Data

(63) Continuation of application No. 13/788,909, filed on Mar. 7, 2013, now Pat. No. 8,850,531.

(51) Int. Cl.
*G06F 21/60* (2013.01)
*H04L 29/08* (2006.01)
(Continued)

(52) U.S. Cl.
CPC .............. *G06F 21/60* (2013.01); *H04L 51/14* (2013.01); *H04L 67/02* (2013.01); *H04W 4/185* (2013.01);
(Continued)

(58) Field of Classification Search
CPC ....... G06F 21/60; H04L 67/02; H04L 51/04; H04L 63/10; H04L 51/14; H04L 51/32; H04L 2463/101; H04L 67/26; H04W 4/185; H04W 4/12

USPC ................. 726/4, 26; 705/14.58, 14.5, 14.67
See application file for complete search history.

(56) References Cited

U.S. PATENT DOCUMENTS 6,026,368 A * 2/2000 Brown ................... G06Q 30/02
705/14.56
6,363,320 B1    3/2002 Chou ............................ 701/207
(Continued)

FOREIGN PATENT DOCUMENTS

EP    1 045 345    10/2000
EP    2187594 A1    5/2010
(Continued)

OTHER PUBLICATIONS

U.S. Appl. No. 14/180,845, a non-final Office Action, mailed Aug. 27, 2015, 43 pages.
(Continued)

*Primary Examiner* — Shanto M Abedin
(74) *Attorney, Agent, or Firm* — Sheppard Mullin Richter & Hampton LLP

(57) ABSTRACT

The disclosure relates to systems and methods for targeted messaging, workflow management, and digital rights management for geofeeds, including content that is related to geographically definable locations and aggregated from a plurality of social media or other content providers. The system may facilitate targeted messaging to users who create content. The targeted messaging may be based on the content (or location related to the content) such as a request for additional information or a promotional message. The system may generate workflows that allow management of the content with respect to operational processes of an entity that wishes to use the content and facilitates the management of usage rights related to the content as well as payments related to such usage rights. For example, the system may store whether content requires permission to use the content and/or whether such permission was obtained and facilitates payment.

18 Claims, 9 Drawing Sheets

(51) Int. Cl.
*H04W 4/18* (2009.01)
*H04L 29/06* (2006.01)
*H04L 12/58* (2006.01)
*H04W 4/12* (2009.01)

(52) U.S. Cl.
CPC .............. *H04L 51/32* (2013.01); *H04L 63/10* (2013.01); *H04L 67/26* (2013.01); *H04L 2463/101* (2013.01); *H04W 4/12* (2013.01)

(56) References Cited

U.S. PATENT DOCUMENTS

| | | |
|---|---|---|
| 6,591,266 B1 | 7/2003 | Li et al. ................ 707/10 |
| 7,522,940 B2 | 4/2009 | Jendbro et al. ............ 455/566 |
| 7,680,796 B2 * | 3/2010 | Yeh ................. G06F 17/3087 707/724 |
| 7,698,336 B2 | 4/2010 | Nath .................... 707/737 |
| 7,912,451 B2 | 3/2011 | Eckhart .................. 455/410 |
| 7,974,983 B2 | 7/2011 | Goeldi |
| 8,103,741 B2 | 1/2012 | Frazier et al. ............ 709/217 |
| 8,341,223 B1 | 12/2012 | Patton et al. ............ 709/204 |
| 8,428,228 B1 | 4/2013 | Baxter, Jr. ............ 379/88.14 |
| 8,484,224 B1 | 7/2013 | Harris et al. ............ 707/748 |
| 8,595,317 B1 | 11/2013 | Harris et al. ............ 709/204 |
| 8,612,533 B1 | 12/2013 | Harris et al. ............ 709/206 |
| 8,639,767 B1 | 1/2014 | Harris et al. ............ 709/207 |
| 8,655,873 B2 | 2/2014 | Mitchell et al. ............ 707/724 |
| 8,655,983 B1 | 2/2014 | Harris et al. ............ 709/217 |
| 8,812,951 B1 | 8/2014 | White |
| 8,843,515 B2 | 9/2014 | Burris .................... 707/769 |
| 8,849,935 B1 | 9/2014 | Harris et al. ............ 709/206 |
| 8,850,531 B1 | 9/2014 | Harris et al. ................ 726/4 |
| 8,862,589 B2 | 10/2014 | Harris et al. ............ 707/743 |
| 8,990,346 B2 | 3/2015 | Harris et al. ............ 709/217 |
| 9,055,074 B2 | 6/2015 | Harris |
| 9,077,675 B2 | 7/2015 | Harris |
| 9,077,782 B2 | 7/2015 | Harris |
| 9,258,373 B2 | 2/2016 | Harris |
| 9,307,353 B2 | 4/2016 | Harris |
| 9,317,600 B2 | 4/2016 | Harris |
| 9,369,533 B2 | 6/2016 | Harris |
| 2002/0029226 A1 | 3/2002 | Li et al. ................ 707/104.1 |
| 2002/0029384 A1 | 3/2002 | Griggs |
| 2002/0116505 A1 | 8/2002 | Higgins et al. ............ 709/227 |
| 2002/0128908 A1 * | 9/2002 | Levin ................. G06Q 30/02 705/14.53 |
| 2002/0188669 A1 | 12/2002 | Levine |
| 2003/0018607 A1 | 1/2003 | Lennon |
| 2003/0025832 A1 | 2/2003 | Swart |
| 2003/0040971 A1 | 2/2003 | Freedenberg |
| 2003/0088609 A1 | 5/2003 | Guedalia et al. ............ 709/107 |
| 2004/0203854 A1 | 10/2004 | Nowak .................... 455/456.1 |
| 2004/0205585 A1 | 10/2004 | McConnell |
| 2004/0225635 A1 | 11/2004 | Toyama et al. ................ 707/1 |
| 2005/0034074 A1 | 2/2005 | Munson et al. ............ 715/712 |
| 2006/0002317 A1 | 1/2006 | Punaganti Venkata ....... 370/310 |
| 2006/0106778 A1 | 5/2006 | Baldwin |
| 2006/0184968 A1 | 8/2006 | Clayton et al. ................ 725/56 |
| 2006/0200305 A1 | 9/2006 | Sheha et al. ............ 701/200 |
| 2007/0043721 A1 | 2/2007 | Ghemawat et al. ............ 707/7 |
| 2007/0112729 A1 | 5/2007 | Wiseman et al. ............ 707/3 |
| 2007/0121843 A1 | 5/2007 | Atazky et al. ............ 379/114.13 |
| 2007/0143345 A1 | 6/2007 | Jones et al. ............ 707/104.1 |
| 2007/0210937 A1 | 9/2007 | Smith et al. ............ 340/995.1 |
| 2007/0276919 A1 | 11/2007 | Buchmann et al. ............ 709/217 |
| 2007/0294299 A1 | 12/2007 | Goldstein |
| 2008/0092054 A1 | 4/2008 | Bhumkar et al. ............ 715/739 |
| 2008/0104019 A1 | 5/2008 | Nath .................... 707/3 |
| 2008/0125969 A1 | 5/2008 | Chen et al. ............ 701/211 |
| 2008/0147674 A1 | 6/2008 | Nandiwada |
| 2008/0162540 A1 | 7/2008 | Parikh et al. ............ 707/102 |
| 2008/0189099 A1 | 8/2008 | Friedman |
| 2008/0192934 A1 | 8/2008 | Nelger et al. ............ 380/258 |
| 2008/0250031 A1 | 10/2008 | Ting et al. ............ 707/100 |
| 2008/0294603 A1 | 11/2008 | Ranjan et al. ............ 707/3 |
| 2009/0005968 A1 | 1/2009 | Vengroff et al. ............ 701/202 |
| 2009/0102859 A1 | 4/2009 | Athsani et al. ............ 345/619 |
| 2009/0132435 A1 | 5/2009 | Titus et al. ................ 705/400 |
| 2009/0138497 A1 | 5/2009 | Zavoli et al. ............ 707/102 |
| 2009/0210426 A1 | 8/2009 | Kulakov |
| 2009/0217232 A1 | 8/2009 | Beerel |
| 2009/0222482 A1 | 9/2009 | Klassen |
| 2009/0297118 A1 | 12/2009 | Fink |
| 2009/0300528 A1 | 12/2009 | Stambaugh ............ 715/764 |
| 2009/0327232 A1 | 12/2009 | Carter et al. ............ 707/3 |
| 2010/0010907 A1 | 1/2010 | Dasgupta |
| 2010/0030648 A1 | 2/2010 | Manolescu |
| 2010/0076968 A1 | 3/2010 | Boyns et al. ............ 707/732 |
| 2010/0079338 A1 * | 4/2010 | Wooden ............... G06Q 30/02 342/357.64 |
| 2010/0083124 A1 | 4/2010 | Druzgalski |
| 2010/0145947 A1 | 6/2010 | Kolman et al. ............ 707/736 |
| 2010/0149399 A1 | 6/2010 | Mukai et al. ............ 348/333.02 |
| 2010/0153386 A1 | 6/2010 | Tysowski ............ 707/736 |
| 2010/0153410 A1 | 6/2010 | Jin et al. ............ 707/758 |
| 2010/0174998 A1 | 7/2010 | Lazarus et al. ............ 715/751 |
| 2010/0177120 A1 | 7/2010 | Balfour ............ 345/647 |
| 2010/0180001 A1 | 7/2010 | Hardt ............ 709/207 |
| 2011/0007941 A1 | 1/2011 | Chen et al. ............ 382/103 |
| 2011/0010674 A1 | 1/2011 | Knize et al. ............ 715/849 |
| 2011/0035284 A1 | 2/2011 | Moshfeghi ............ 705/14.58 |
| 2011/0040894 A1 | 2/2011 | Shrum |
| 2011/0055176 A1 | 3/2011 | Choi |
| 2011/0072106 A1 | 3/2011 | Hoffert |
| 2011/0072114 A1 | 3/2011 | Hoffert |
| 2011/0078584 A1 | 3/2011 | Winterstein et al. ......... 715/751 |
| 2011/0083013 A1 | 4/2011 | Nice et al. ............ 713/168 |
| 2011/0113096 A1 | 5/2011 | Long et al. ............ 709/204 |
| 2011/0123066 A9 | 5/2011 | Chen et al. ............ 382/103 |
| 2011/0131496 A1 | 6/2011 | Abram et al. ............ 715/722 |
| 2011/0137561 A1 | 6/2011 | Kankainen ............ 701/300 |
| 2011/0142347 A1 | 6/2011 | Chen et al. ............ 382/190 |
| 2011/0153368 A1 | 6/2011 | Pierre et al. ............ 705/4 |
| 2011/0202544 A1 | 8/2011 | Carle et al. ............ 707/754 |
| 2011/0227699 A1 | 9/2011 | Seth et al. ............ 340/8.1 |
| 2011/0270940 A1 | 11/2011 | Johnson et al. ............ 709/207 |
| 2011/0288917 A1 * | 11/2011 | Wanek ................. G06Q 30/00 705/14.5 |
| 2011/0307307 A1 | 12/2011 | Benmbarek |
| 2012/0001938 A1 | 1/2012 | Sandberg ............ 345/633 |
| 2012/0047219 A1 | 2/2012 | Feng et al. ............ 709/207 |
| 2012/0077521 A1 | 3/2012 | Boldyrev |
| 2012/0078503 A1 | 3/2012 | Dzubay et al. ............ 701/410 |
| 2012/0084323 A1 | 4/2012 | Epshtein et al. ............ 707/776 |
| 2012/0101880 A1 * | 4/2012 | Alexander ............ G06Q 30/02 705/14.5 |
| 2012/0124161 A1 | 5/2012 | Tidwell |
| 2012/0150901 A1 | 6/2012 | Johnson et al. ............ 707/769 |
| 2012/0158536 A1 | 6/2012 | Gratton |
| 2012/0166367 A1 | 6/2012 | Murdock et al. ............ 706/12 |
| 2012/0212398 A1 | 8/2012 | Border et al. ............ 345/8 |
| 2012/0221687 A1 | 8/2012 | Hunter et al. ............ 709/219 |
| 2012/0232939 A1 | 9/2012 | Pierre et al. ............ 705/4 |
| 2012/0233158 A1 | 9/2012 | Braginsky |
| 2012/0239763 A1 | 9/2012 | Musil |
| 2012/0254774 A1 | 10/2012 | Patton ............ 715/758 |
| 2012/0259791 A1 | 10/2012 | Zoidze ............ 705/319 |
| 2012/0276848 A1 | 11/2012 | Krattiger et al. ............ 455/41.2 |
| 2012/0276918 A1 | 11/2012 | Krattiger et al. ............ 455/456.1 |
| 2012/0323687 A1 * | 12/2012 | Schuster ............ G06Q 30/02 705/14.58 |
| 2012/0330959 A1 | 12/2012 | Kretz et al. ............ 707/739 |
| 2013/0013713 A1 | 1/2013 | Shoham ............ 709/206 |
| 2013/0018957 A1 | 1/2013 | Parnaby et al. ............ 709/204 |
| 2013/0051611 A1 | 2/2013 | Hicks ............ 382/103 |
| 2013/0054672 A1 | 2/2013 | Stilling |
| 2013/0060796 A1 | 3/2013 | Gilg |
| 2013/0073388 A1 | 3/2013 | Heath ............ 705/14.53 |
| 2013/0073389 A1 | 3/2013 | Heath |
| 2013/0073631 A1 | 3/2013 | Patton et al. ............ 709/204 |
| 2013/0110631 A1 * | 5/2013 | Mitchell ............ H04W 4/185 705/14.58 |
| 2013/0110641 A1 | 5/2013 | Ormont |
| 2013/0124437 A1 | 5/2013 | Pennacchiotti |

(56) References Cited

U.S. PATENT DOCUMENTS

| | | | |
|---|---|---|---|
| 2013/0131918 A1 | 5/2013 | Hahne | |
| 2013/0132194 A1 | 5/2013 | Rajaram | |
| 2013/0150015 A1 | 6/2013 | Valko et al. | 455/418 |
| 2013/0159463 A1* | 6/2013 | Bentley | H04L 67/10 709/217 |
| 2013/0201182 A1 | 8/2013 | Kuroki et al. | 345/419 |
| 2013/0238599 A1 | 9/2013 | Burris | 707/722 |
| 2013/0238652 A1 | 9/2013 | Burris | 707/769 |
| 2013/0238658 A1 | 9/2013 | Burris | 707/770 |
| 2013/0268558 A1 | 10/2013 | Burris | 707/770 |
| 2013/0346563 A1 | 12/2013 | Huang | 709/219 |
| 2014/0025911 A1 | 1/2014 | Sims | |
| 2014/0040371 A1 | 2/2014 | Gurevich | |
| 2014/0089296 A1 | 3/2014 | Burris | 707/722 |
| 2014/0089343 A1 | 3/2014 | Burris et al. | 707/770 |
| 2014/0089461 A1 | 3/2014 | Harris et al. | 709/217 |
| 2014/0095509 A1 | 4/2014 | Patton | 707/740 |
| 2014/0164368 A1 | 6/2014 | Mitchell et al. | 707/724 |
| 2014/0195918 A1 | 7/2014 | Friedlander | |
| 2014/0207893 A1 | 7/2014 | Harris et al. | 709/207 |
| 2014/0222950 A1 | 8/2014 | Rabel | |
| 2014/0236882 A1 | 8/2014 | Rishe | |
| 2014/0256355 A1 | 9/2014 | Harris et al. | 455/456.3 |
| 2014/0258451 A1 | 9/2014 | Harris et al. | 709/217 |
| 2014/0259113 A1 | 9/2014 | Harris et al. | 726/4 |
| 2014/0274148 A1 | 9/2014 | Harris et al. | 455/456.3 |
| 2014/0280103 A1 | 9/2014 | Harris et al. | 707/724 |
| 2014/0280278 A1 | 9/2014 | Harris et al. | 707/758 |
| 2014/0280569 A1 | 9/2014 | Harris et al. | 709/204 |
| 2014/0297740 A1 | 10/2014 | Narayanan | |
| 2015/0019648 A1 | 1/2015 | Harris et al. | 709/204 |
| 2015/0019866 A1 | 1/2015 | Braness | |
| 2015/0032739 A1 | 1/2015 | Harris et al. | 707/724 |
| 2015/0172396 A1 | 6/2015 | Longo | |
| 2015/0256632 A1 | 9/2015 | Harris | |
| 2015/0381380 A1 | 12/2015 | Harris | |
| 2016/0006783 A1 | 1/2016 | Harris | |
| 2016/0014219 A1 | 1/2016 | Harris | |
| 2016/0182656 A1 | 6/2016 | Harris | |

FOREIGN PATENT DOCUMENTS

| | | |
|---|---|---|
| EP | 2293566 A2 | 3/2011 |
| WO | WO 99/15995 | 4/1999 |
| WO | WO 2010/049918 | 5/2010 |
| WO | WO 2013/133870 | 9/2013 |
| WO | WO 2013/134451 | 9/2013 |

OTHER PUBLICATIONS

U.S. Appl. No. 14/215,612, a non-final Office Action, mailed Aug. 18, 2015, 27 pages.
U.S. Appl. No. 14/500,832, a non-final Office Action, mailed May 21, 2015, 13 pages.
U.S. Appl. No. 14/512,293, a final Office Action, mailed Aug. 14, 2015, 15 pages.
U.S. Appl. No. 14/666,056, a non-final Office Action, mailed Aug. 10, 2015, 17 pages.
U.S. Appl. No. 13/284,455, a non-final Office Action, mailed Jan. 7, 2013, 18 pages.
U.S. Appl. No. 13/619,888, a non-final Office Action, mailed Mar. 1, 2013, 15 pages.
U.S. Appl. No. 13/708,466, a non-final Office Action, mailed Apr. 17, 2013, 15 pages.
U.S. Appl. No. 13/708,516, a non-final Office Action, mailed May 15, 2013, 11 pages.
U.S. Appl. No. 13/708,404, a Notice of Allowance, mailed May 24, 2013, 12 pages.
U.S. Appl. No. 13/284,455, a non-final Office Action, mailed Jun. 4, 2013, 28 pages.
U.S. Appl. No. 13/708,516, a Notice of Allowance, mailed Jun. 7, 2013, 14 pages.
U.S. Appl. No. 13/619,888, a Notice of Allowance, mailed Jul. 9, 2013, 10 pages.
U.S. Appl. No. 13/788,760, a Notice of Allowance, mailed Jul. 26, 2013, 12 pages.
U.S. Appl. No. 13/788,843, a non-final Office Action, mailed Aug. 5, 2013, 17 pages.
U.S. Appl. No. 13/788,909, a non-final Office Action, mailed Aug. 12, 2013, 17 pages.
U.S. Appl. No. 13/843,949, a non-final Office Action, mailed Aug. 29, 2013, 12 pages.
U.S. Appl. No. 13/708,466, a Notice of Allowance, mailed Sep. 3, 2013, 11 pages.
U.S. Appl. No. 13/843,832, a non-final Office Action, mailed Sep. 13, 2013, 12 pages.
U.S. Appl. No. 13/284,455, a Notice of Allowance, mailed Oct. 4, 2013, 17 pages.
U.S. Appl. No. 13/788,843, a final Office Action, mailed Jan. 21, 2014, 25 pages.
U.S. Appl. No. 13/843,832, a Notice of Allowance, mailed Jan. 24, 2014, 6 pages.
U.S. Appl. No. 13/788,909, a Notice of Allowance, mailed Jan. 24, 2014, 12 pages.
U.S. Appl. No. 13/843,949, a Notice of Allowance, mailed Feb. 3, 2014, 11 pages.
U.S. Appl. No. 13/843,949, a Notice of Allowance, mailed May 9, 2014, 10 pages.
U.S. Appl. No. 13/843,832, a Notice of Allowance, mailed May 20, 2014, 7 pages.
U.S. Appl. No. 13788,909, a Notice of Allowance, mailed Jun. 24, 2014, 11 pages.
U.S. Appl. No. 14/089,631, a non-final Office Action, mailed Jul. 8, 2014, 21 pages.
U.S. Appl. No. 14/180,473, a non-final Office Action, mailed Jul. 8, 2014, 18 pages.
Chow et al., "Towards Location-Based Social Networking Services", *LBSN 2010 Proceedings of the 2nd ACM SIGSPATIAL International Workshop on Location Based Social Networks*, Nov. 2, 2010, pp. 31-38.
Bao, Jie, et al., "GeoFeed: A Location-Aware News Feed System", *IEEE Xplore® Digital Library*, Published in *2012 IEEE 28th International Conference on Data Engineering*, Apr. 1-5, 2012, 14 pages.
Sarwat, Mohamed, et al., "Sindbad: A Location-Based Social Networking System", *SIGMOD '12*, Scottsdale, Arizona, May 20-24, 2012, 4 pages.
Amitay et al., "Web-a-Where: Geotagging Web Content", *Proceedings of the 27th Annual International ACM SIGIR Conference on Research and Development in Information Retrieval (SIGIR)*, 2004, pp. 273-280.
U.S. Appl. No. 14/215,612, a non-final Office Action, mailed Jul. 11, 2014, 16 pages.
U.S. Appl. No. 14/108,301, a non-final Office Action, mailed Sep. 11, 2014, 10 pages.
U.S. Appl. No. 14/164,362, a non-final Office Action, mailed Oct. 23, 2014, 15 pages.
U.S. Appl. No. 14/180,845, a non-final Office Action, mailed Oct. 23, 2014, 32 pages.
U.S. Appl. No. 14/215,612, a final Office Action, mailed Nov. 28, 2014, 31 pages.
U.S. Appl. No. 14/089,631, a final Office Action, mailed Jan. 2, 2015, 8 pages.
U.S. Appl. No. 14/180,473, a final Office Action, mailed Jan. 5, 2015, 7 pages.
U.S. Appl. No. 14/180,473, a Notice of Allowance, mailed Jan. 27, 2015, 8 pages.
U.S. Appl. No. 14/512,293, a non-final Office Action, mailed Jan. 28, 2015, 18 pages.
U.S. Appl. No. 14/089,631, a Notice of Allowance, mailed Feb. 2, 2015, 10 pages.
U.S. Appl. No. 13/788,843, a non-final Office Action, mailed Feb. 20, 2015, 26 pages.
U.S. Appl. No. 14/108,301, a Notice of Allowance, mailed Feb. 20, 2015, 13 pages.

(56) References Cited

OTHER PUBLICATIONS

U.S. Appl. No. 14/164,362, a Notice of Allowance, mailed Feb. 24, 2015, 22 pages.
U.S. Appl. No. 14/180,845, a final Office Action, mailed Feb. 25, 2015, 32 pages.
Lee et al., "Tag-Geotag Correlation in Social Networks", *Proceedings of the 2008 ACM Workshop on Search in Social Media*, 2008, pp. 59-66.
U.S. Appl. No. 13/788,843, a Notice of Allowance, mailed Dec. 3, 2015, 18 pages.
U.S. Appl. No. 14/512,293, a non-final Office Action, mailed Dec. 9, 2015, 14 pages.
U.S. Appl. No. 14/666,056, a Final Office Action, mailed Jan. 4, 2016, 11 pages.
U.S. Appl. No. 14/813,031, a non-final Office Action, mailed Nov. 24, 2015, 23 pages.
U.S. Appl. No. 14/813,039, a non-final Office Action, mailed Jan. 20, 2016, 20 pages.
U.S. Appl. No. 14/180,845, a final Office Action, mailed Feb. 22, 2016, 43 pages.
U.S. Appl. No. 14/512,293, a Final Office Action, mailed Apr. 6, 2016, 9 pages.
U.S. Appl. No. 14/733,715, a non-final Office Action, mailed Mar. 11, 2016, 25 pages.
U.S. Appl. No. 14/792,538, a non-final Office Action, mailed Feb. 26, 2016, 20 pages.
U.S. Appl. No. 14/813,031, a final Office Action, mailed Mar. 21, 2016, 41 pages.
U.S. Appl. No. 14/813,039, a Final Office Action, mailed May 16, 2016, 14 pages.
U.S. Appl. No. 14/180,845, a non-final Office Action issued by Examiner Augustine Kunle Obisesan, mailed Jul. 7, 2016, 51 pages.
U.S. Appl. No. 15/018,767, a non-final Office Action issued by Examiner Bharat Barot, mailed Jun. 3, 2016, 19 pages.

\* cited by examiner

SYSTEM AND METHOD FOR TARGETED MESSAGING, WORKFLOW MANAGEMENT, AND DIGITAL RIGHTS MANAGEMENT FOR GEOFEEDS

CROSS-REFERENCE TO RELATED APPLICATIONS

This application is a continuation U.S. patent application Ser. No. 13/788,909, filed Mar. 7, 2013, which is hereby incorporated by reference in its entirety.

FIELD OF THE INVENTION

The disclosure relates to systems and methods for targeted messaging, workflow management, and digital rights management for geofeeds, including content that is related to geographically definable locations and aggregated from a plurality of social media or other content providers.

BACKGROUND OF THE INVENTION

The availability of content such as videos, audio files, photos, text, and/or other content over networks such as the Internet has grown at impressive rates. Many Internet and other online service providers make this type of content available to enable users to post and share such content through their services. However, various limitations exist with respect to how this vast amount of information can be effectively monitored and/or selectively displayed.

Because of the vast amount of information and different ways in which to communicate with users, it can be difficult to communicate with creators of the content. Furthermore, it may be difficult to incorporate the content into operational processes of entities that wish to use the content. For example, use of the content may require approval processes that may be difficult to manage for re-syndication or re-publication as required by law and/or terms of service of content providers. Even when a decision to use the content is made, in many instances the content may be subject to requirements that are to be satisfied prior to using the content, which may be unknown to decision makers.

These and other problems exist.

SUMMARY OF THE INVENTION

The disclosure relates to systems and methods for targeted messaging, workflow management, and digital rights management for geofeeds, including content that is related to geographically definable locations ("geo-locations") and aggregated from a plurality of social media or other content providers. A geofeed may include content that is aggregated from a plurality of content providers using respective requests formatted specifically for individual ones of the plurality of content providers, where an individual set of a plurality of content is relevant to one or more geo-locations.

In some embodiments, the system may facilitate targeted messaging to users who create content. The targeted messages may include, for example, messages to obtain permission to use content from an owner of the content, messages to request additional information about a breaking news event, messages to seek further information about an experience, messages to obtain a following on TWITTER for one-on-one communications, messages that offer a promotion or coupon, and/or other types of messages.

In some embodiments, the system may generate workflows that allow management of the content with respect to one or more operational processes of an entity such as a user, an organization, and/or other entity that wishes to use the content. The workflows allow creation and tracking of workflow items to be performed with respect to the content, thereby allowing the entity to manage and integrate the content with its own assets such as a website, a mobile application, and/or other asset.

In some embodiments, the system facilitates the management of usage rights related to the content. For example, the system may store whether content requires permission to use the content and/or whether such permission was obtained. By doing so, the system may facilitate a database of content that has been permitted to be used.

The system may leverage permission information, geo-location information associated with the content, keyword information, and/or other information known by the system to build a robust and searchable clearinghouse database of content that may be permissibly used and/or licensed to others. For example, a news agency or others who wish to obtain content such as photographs related to a particular geo-location may obtain such content from the clearinghouse database. Thus, content related to rioting in a particular geo-location and obtained from social media and other providers may be found and/or licensed for use from the clearinghouse database.

The system may facilitate various requirements that are to be satisfied in order to use the content. For example, the system may facilitate payment of royalty or other fees, attribution notices, and/or other requirements that are to be satisfied to use the content.

In some embodiments, the system may include a computer that includes one or more processors configured to perform some or all of a functionality of a plurality of modules. For example, the one or more processors may be configured to execute a geofeed creation module, a unified message module, a workflow module, a clearinghouse module, an administration module, a communication module, a user interface module, and/or other modules.

The geofeed creation module may be configured to receive a request to create a geofeed based on a specification of one or more geo-locations. The request may include one or more geofeed parameters, and/or other parameters. The one or geofeed parameters may be used to filter content into the geofeed and/or out of the geofeed.

The geofeed creation module may generate a geofeed definition that includes the specification of the one or more geo-locations, the one or more geofeed parameters, and/or other information related to the geofeed. The geofeed definition may be updated. For example, the specification of the one or more geo-locations, the one or more geofeed parameters, and/or other information of the geofeed definition may be updated. In this manner, various parameters related to geofeeds may be defined or updated at the time of specifying the geofeeds and/or after the geofeeds have been specified.

To create the geofeed, the geofeed creation module may obtain the specification of the one or more geo-locations from the geofeed definition and generate requests that specify the one or more geo-locations specifically for individual ones of the plurality of content providers. In some embodiments, the geofeed creation module may create a single geofeed having a plurality of geo-locations that are grouped with respect to one another. In other embodiments, the geofeed creation module may create multiple distinct geofeeds, which may each be associated with one or more geo-locations that are grouped with respect to one another. In these embodiments, each set of individual content may correspond to a single geofeed.

In some embodiments, the unified message module may be configured to generate one or more messages to be communicated to a message recipient, which may include a system user (e.g., a user who is registered to use the system), a content creator (who may or may not include a system user), and/or other message recipient. For example, the unified message module may facilitate targeted messaging to the message recipient.

In some embodiments, the workflow module may be configured to generate workflows that allow management of the content with respect to operational processes of an entity such as a user, an organization, and/or other entity that wishes to use the content. The workflows allow creation and tracking of workflow items to be performed with respect to the content, thereby allowing the entity to manage and integrate the content with its own assets such as a website, a mobile application, and/or other asset.

In some embodiments, the content may be subject to one or more requirements that should be met before using (e.g., copying, modifying, distributing, etc.) the content. The one or more requirements may include a royalty to be paid, an attribution requirement, and/or other requirement. The clearinghouse module may be configured to store and provide the requirements and the content, either or both of which may be searchable. Thus, the clearinghouse module may generate a clearinghouse database that includes the content (or links to the content) and requirements of the content. In this manner, a user may view content related to a geo-location and determine whether the content may be used.

In some embodiments, the clearinghouse module may facilitate payments in relation to an authorization to use the content. For example, the payment may include a one-time payment, a recurring payment, a payment based on use of the content, and/or other payment. Payments may be facilitated via one or more accounts related to the clearinghouse module, conventional electronic payments, paper billing, and/or other payment methods. In this manner, the clearinghouse module may facilitate the use of content that may be otherwise subject to ownership rights of the content.

In some embodiments, the administration module may be configured to manage user accounts, set user roles such as security access roles, and/or perform other administrative operations. For example, the administration module may be used to set which user may access different views, curate geofeeds, view and manage curated content, decide whether to burn a geofeed such as by storing content or information related to the content, and/or provide other security roles.

In some embodiments, the communication module may be configured to share a geofeed via a content provider such as a social media provider, email, SMS text, and/or other communication channels. In some embodiments, the communication module may be configured to communicate a geofeed via various feeds such as Really Simple Syndication ("RSS") and ATOM feeds, a vanity Uniform Resource Locator ("URL") using a name of the geofeed (e.g., a name assigned by the content consumer), and/or other communication channels.

In some embodiments, the user interface module may be configured to generate user interfaces that allow viewing and interaction with the geofeeds. For example, the user interface module may present various displays for sending/receiving messages, managing workflows, managing information related to ownership rights of the content, displaying geofeeds, requesting geofeeds, and/or otherwise displaying information related to the content.

These and other objects, features, and characteristics of the system and/or method disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

DETAILED DESCRIPTION OF THE INVENTION

Figure 1:
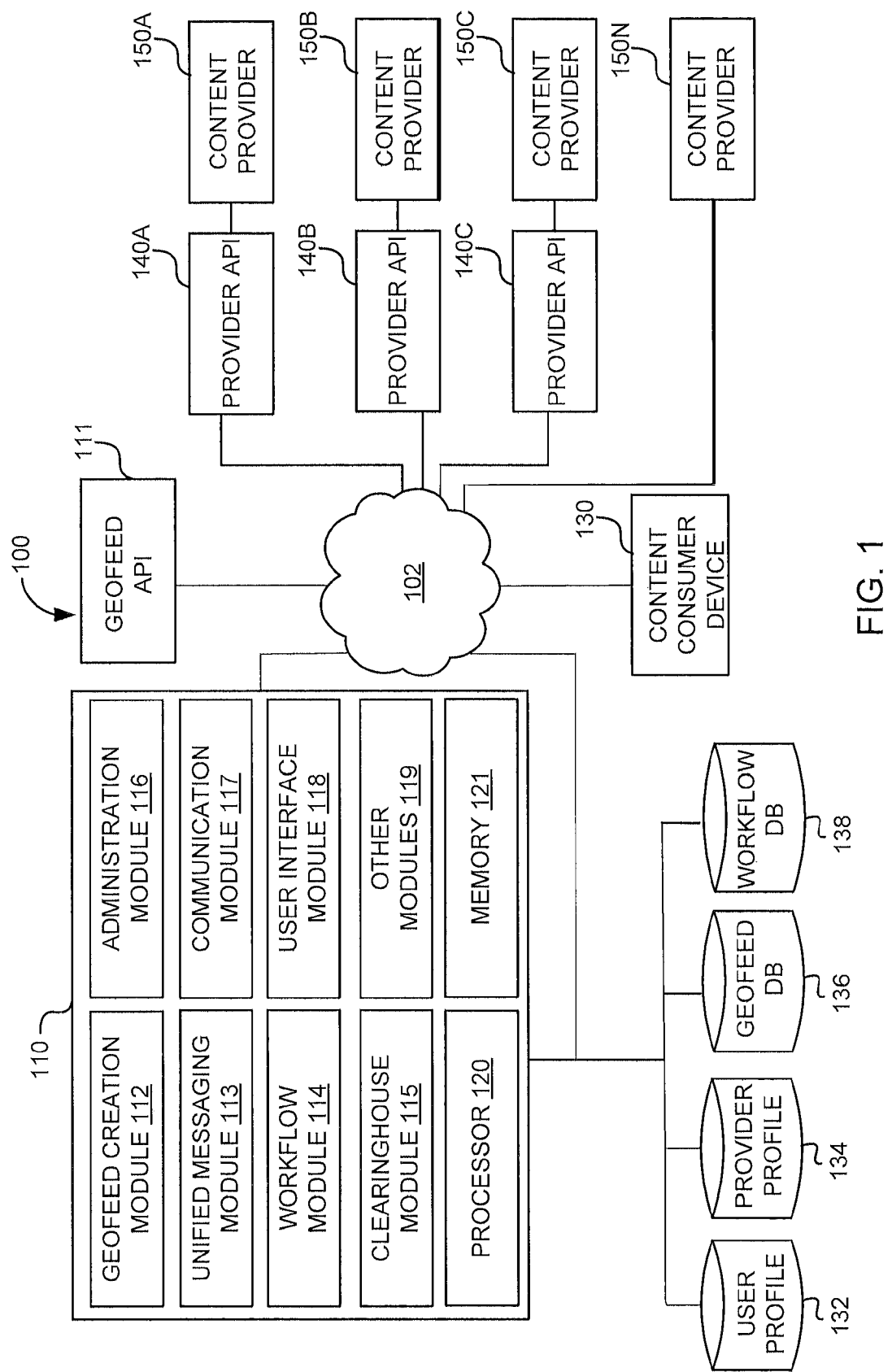
FIG. 1 illustrates a system of targeted messaging, workflow management, and digital rights management for geofeeds, according to an aspect of the invention.

FIG. 1 illustrates a system 100 of targeted messaging, workflow management, and digital rights management for geofeeds, according to an aspect of the invention. A geofeed includes a collection of content (also referred to herein as "geofeed content"), aggregated from various content providers, that is relevant to a geographically definable location (hereinafter, a "geo-location"). The content providers may include, for example, social media platforms (e.g., FACEBOOK, TWITTER, INSTAGRAM, FLICKR, etc.), online knowledge databases, and/or other providers that can distribute content that may be relevant to a geo-location.

The geo-location may be specified by a boundary, geo coordinates (e.g., latitude, longitude, altitude/depth), an address, a school, a place name, a point of interest, a zip code, a city, a state, a country, and/or other information that can spatially identify an area. The content may be generated by content sources such as individuals, corporations, and/or other entities that may create content. As used hereinafter, "a location," "a geo-location," "a geographically definable location," and similar language is not limited to a single location but may also refer to one or more such locations.

In many instances the content can be automatically tagged with information. The information may include a user identification, date/time information related to the content (e.g., a date and/or time that indicates when the content was created, uploaded, etc.), geographic information that specifies a location where the content was created, uploaded, etc., and/or other information. For example, cameras equipped with a Global Positioning Satellite ("GPS") unit and/or other location-aware system may embed into an image file latitude/longitude coordinates that indicate where a picture was taken. In addition, modern hand-held devices such as smartphones may be equipped with a GPS sensor, which allows users to generate content with their devices and share the content through a plurality of social networks and other providers. Moreover, some devices allow users to manually input the foregoing and other information for embedding into the content. Furthermore, editing software may allow a user to embed or otherwise manually and/or automatically include information along with the content after the content was created.

System 100 may include a computer 110, a geofeed API 111, a content consumer device 130, provider APIs 140, content providers 150, and/or other components. In some embodiments, computer 110 may include one or more processors 120 configured to perform some or all of a functionality of a plurality of modules, which may be stored in a memory 121. For example, the one or more processors 120 may be configured to execute a geofeed creation module 112, a unified message module 113, a workflow module 114, a clearinghouse module 115, an administration module 116, a communication module 117, a user interface module 118, and/or other modules 119. Geofeed API 111 may be used to interface with computer 110 to interface with computer 110 in relation to the geofeeds.

Geofeed creation module 112 may be configured to create one or more geofeeds, as described in U.S. patent application Ser. No. 13/284,455, filed Oct. 28, 2011, entitled "SYSTEM AND METHOD FOR AGGREGATING AND DISTRIBUTING GEOTAGGED CONTENT," and U.S. patent application Ser. No. 13/619,888, filed Sep. 14, 2012, entitled "SYSTEM AND METHOD FOR GENERATING, ACCESSING, AND UPDATING GEOFEEDS" both of which are incorporated by reference herein in their entireties.

U.S. Patent application Ser. No. 13/788,843, filed on Mar. 7, 2013, entitled "SYSTEM AND METHOD FOR DIFFERENTIALLY PROCESSING A LOCATION INPUT FOR CONTENT PROVIDERS THAT USE DIFFERENT LOCATION INPUT FORMATS," and U.S. patent application Ser. No. 13/788,760, filed on Mar. 7, 2013, entitled "SYSTEM AND METHOD FOR CREATING AND MANAGING GEOFEEDS," are all incorporated by reference in their entireties herein.

Co-pending U.S. patent application Ser. No. 13/708,516, filed Dec. 7, 2012, entitled "SYSTEM AND METHOD FOR LOCATION MONITORING BASED ON ORGANIZED GEOFEEDS," and co-pending U.S. patent application Ser. No. 13/708,466, filed Dec. 7, 2012, entitled "SYSTEM AND METHOD FOR GENERATING AND MANAGING GEOFEED-BASED ALERTS" are all incorporated by reference in their entireties herein.

Geofeed creation module 112 may be configured to generate one or more geofeeds based on content that is relevant to one or more geographically definable locations ("geo-locations"). The geofeed creation module may format requests that specify one or more geo-locations specifically for individual ones of the plurality of content providers and aggregate the content to form a geofeed. In some embodiments, geofeed creation module 112 may create a single geofeed having a plurality of geo-locations that are grouped with respect to one another. In other embodiments, geofeed creation module 112 may create multiple distinct geofeeds, which may each be associated with one or more geo-locations and may be grouped with respect to one another. In these embodiments, each set of individual content may correspond to a single geofeed.

For example, geofeed creation module 112 may format requests to individual ones of a plurality of APIs 140 (illustrated in FIG. 1 as API 140A, 140B, . . . , 140N). The provider APIs 140 may facilitate receiving content from corresponding content providers 150 (illustrated in FIG. 1 as content providers 150A, 150B, 150C). In some embodiments, geofeed creation module 110 may format a request directly for content provider 150N without using a corresponding API. A content consumer device 130 may request and view geofeeds created by geofeed creation module 112. The formatting instructions may be stored in and recalled from a memory such as provider database 134. Preferences for creating, viewing, and/or managing information related to geofeeds may be stored in and recalled from a memory such as user profile database 132.

In some embodiments, geofeed creation module 112 may generate a geofeed definition that describes a geofeed such that a geofeed may be dynamically generated based on the geofeed definition. For example, the geofeed definition may include the geo-location specification, one or more geofeed parameters used to filter content aggregated from content providers 150, and/or other information related to the geofeed that can be used to aggregate content from various content providers. For example, the one or geofeed parameters may be used to view only particular types of content, content from particular content providers, and/or other parameter by which to filter in or out content. The geofeed definition may be identified by a geofeed identifier and stored (e.g., in database 136) for later retrieval so that a content consumer or others may select and obtain a geofeed that was previously defined.

In some embodiments, geofeed creation module 112 may store the geofeed (e.g., in database 136). For example, geofeed creation module 112 may be configured to store the geofeed by aggregating content from content providers 150 in relation to the geofeed and store the content in association with a geofeed identifier and/or a geofeed definition.

In some embodiments, geofeed creation module 112 may use the credentials of a user for social media or other platform to access content. In this manner, geofeed creation module 112 may obtain content from a content provider using the credentials of the user. For example, geofeed creation module 112 may obtain from the user a username and password (with permission from the user) for the user's TWITTER account and obtain content from TWITTER to which the user has access.

In some embodiments, unified message module 113 may be configured to generate one or more targeted messages to be communicated to a message recipient, which may include a system user (e.g., a user who is registered to use the system), a content creator (who may or may not include a system user), and/or other message recipient. For example, unified message module 113 may facilitate targeted messaging to the message recipient.

Unified message module 113 may be used to generate different types of targeted messages such as, for example, messages to obtain permission to use content from an owner of the content, messages to gather more information about a breaking news event, messages to seek further information about an experience, messages to obtain a following on TWITTER for one-on-one communications, messages to offer a promotion or coupon, and/or other types of messages.

In some embodiments, the targeted message may be generated based on one or more characteristics of the content that was generated by the message recipient. For example, the targeted message may be based on a topic, an event, a geo-location, and/or other characteristic of the content. Various non-limiting examples are provided for illustrative purposes. A content item such as a TWEET may be related to a particular topic such as shoes. The targeted message may include a promotional message based on the topic "shoes." A content item may be related to a particular event such as "rioting." The targeted message may include questions related to obtaining more information about the rioting event. A content item may be geo-tagged associated with a particular geo-location. Unified message module 113 may determine the geo-location and generate a targeted message based on the geo-location.

In some embodiments, various characteristics of the content item may be combined to generate a targeted message. For example, a TWEET that is geo-tagged with a particular geo-coordinate may indicate that the user who made the TWEET is at the particular geo-coordinate. The geo-coordinate may be associated with breaking news or otherwise event of interest. A user may cause a message to be generated that requests a picture or other content from the user who made the TWEET (who in this case is the message recipient).

In some embodiments, unified message module 113 may generate a message based on one or more message templates. A message template may be provided by various template sources such as the system, a user, and/or other template source. The message template may specify a format, a communication channel to be used, a message type, and/or other information related to a message. Different types of message templates may be defined for different types of messages. Different types of messages may include, for example, a request for permission to use content, a promotional message that includes promotional content such as an indication of a sale, a coupon, a promotional offer, and/or other types of promotional content.

In some embodiments, unified message module 113 may automatically generate a message based on one or more message rules. The one or more message rules may be defined by the system, a user, and/or other source of a message rule. The message rule may include instructions or other logic that specifies when a message should be generated, to whom the message should be targeted, and/or other instruction related to the message.

For example, a message rule may indicate that a user who created content of a geofeed that covers a particular retail location of a retail chain should be targeted with a promotional message related to the retail location and/or retail chain. Thus, in this manner, unified message module 113 may automatically generate messages directed to particular users based on the content.

In some embodiments, unified message module 113 may communicate the message in various ways. For example, unified message module 113 may communicate the message via email, SMS text, a message related to a social media account of the user (e.g., a post to a FACEBOOK wall), and/or other channels.

In some embodiments, the targeted message may include a poll that is broadcast to one or more users. For example, based on various social media and other content posted by users who are attending a baseball game, unified message module 113 may determine that the users are attending the baseball game at a particular location such as a baseball stadium. Unified message module 113 may target such users to receive a poll that includes questions about the game, players, and/or other topics. In this example, other messages described herein may be communicated to the users as well.

In some embodiments, the targeted message may include an interface (or a link to such interface) that allows the recipient to respond to the message. For example, the interface may include an interface for redeeming a coupon, an interface for selling or otherwise permitting user of content, an upload interface for providing additional content such as new photographs, and/or other interfaces for responding to the message. In this manner, unified message module 113 may facilitate an exchange of communications to and from one or more recipients of the targeted messages. In some embodiments, the exchange of communications may be stored for later retrieval and communication.

In some embodiments, workflow module 114 may be configured to generate workflows that allow management of the content with respect to operational processes of an entity such as a user, an organization, and/or other entity. The workflows allow creation and tracking of workflow items that represent operational processes to be performed with respect to the content, thereby allowing the entity to manage and integrate the content with its own assets such as a website, a mobile application, and/or other asset. In some embodiments, workflow module 114 may filter and/or rank content for inclusion into a workflow based on various parameters. For example, users may select from among ranked content items for inclusion into a workflow. Examples of filtering and ranking content is described in co-pending U.S. patent application Ser. No. 13/708,404, filed Dec. 7, 2012, entitled "SYSTEM AND METHOD FOR RANKING GEOFEEDS AND CONTENT WITHIN GEOFEEDS," which is incorporated by reference in its entirety herein.

The operational processes may include various processes that an entity such as an organization performs in relation to using, annotating, and/or otherwise dealing with one or more content items. For example, an operational process may include a process for approving content items for use in an online asset such as a website, a process for obtaining permission to use a content item from an owner of the content item, a process for appending annotation information to the content item for later retrieval, a process for generating promotional or marketing materials in relation to the content, and/or other operational processes.

In some embodiments, a workflow item may include or be associated with a workflow item identifier that identifies the workflow item, a description of the operational processes that are to be performed, a status of the workflow item, relevant dates associated with the workflow item (e.g., when an operational process was performed) and/or other information.

Workflow module 114 may receive a request to generate a workflow item from a requester such as a user, a computer (e.g., a process executing on the computer), and/or other requester. The request to generate the workflow item may include workflow item information such as an identification of the content related to the workflow item, a resolver who is to handle the workflow item, a description of the operational process performed or to be performed, and/or other workflow item information.

Workflow module 114 may generate the workflow item based on the request and assign a workflow item identifier for the generated workflow item. An association of the workflow item identifier and a content identifier that identifies the content related to the workflow item may be stored in a memory such as workflow database 138. The content identifier may include an internal content identifier generated by the system and/or an external content identifier assigned by the content provider who provided the content. Workflow module 114 may assign the workflow item to the resolver such as a user, a computer, and/or other resolver who is to handle the workflow item.

In some embodiments, workflow module 114 may obtain user roles associated with various users. The user roles may specify system access in relation to workflow items such as who may submit a workflow item request, who may handle a workflow item request, who may view workflow item requests of others, and/or other system access information. In some embodiments, workflow module 114 may obtain relationships between users such as, for example, a subordinate-boss relationship, a team relationship, and/or other relationships. Using the user roles and/or relationships, workflow module 114 may determine appropriate actions with respect to the workflow items. For example, workflow module 114 may assign a workflow item from a subordinate to a boss (or vice versa), allow a boss to view workflow items related to a subordinate, and/or automatically make other decisions with respect to workflow items.

In some embodiments, workflow module 114 may track a lifecycle of a workflow item. Workflow module 114 may update a workflow item status as processing operations are performed on the workflow item. For example, the workflow item status may indicate that the workflow item has been generated, is assigned, is currently in progress, is resolved, and/or indicate other workflow item status.

A non-limiting example of workflow management will be described in the context of a news service for illustrative purposes. Other examples and embodiments of workflow module 114 will be apparent to those having skill in the art. A news service may wish to maintain certain standards for work published using its assets such as its website and therefore may require approval by an editor prior to publishing work on the website. Thus, an operational process of approving such works may be required by the news service.

Workflow module 114 may manage the operational process of approving work prior to publication. For example, using various interfaces provided by the system described herein, a first user such as a reporter may review various content items, which may be included in one or more geofeeds. The first user may wish to use a content item such as a photograph from INSTAGRAM. The first user may generate a workflow item request related to approval of the photograph for use in the website of the news service. Workflow module 114 may generate the workflow item based on the workflow item request.

The workflow item may be assigned to a second user such as the editor for approving the photograph. In some embodiments, workflow module 114 may automatically assign the workflow item to the second user based on user roles and/or relationships. For example, the second user may be associated with a user role "editor" such that workflow module 114 may recognize that the second user should be assigned the workflow item. In another example, the first user and the second user may share a relationship "reporter-editor" such that workflow module 114 may recognize that the second user should be assigned the workflow item. In another example, workflow module 114 may identify content items that reflect negative consumer sentiment and, in response, automatically generate and assign a workflow item to a customer service representative.

In some embodiments, the workflow item request may indicate that the second user should be assigned the workflow item. The second user may view the workflow item, review the content to be approved, which may be displayed in association with the workflow item, and provide an indication that the content is approved, rejected, deferred until further discussion, and/or other indication. In some embodiments, workflow module 114 may store the indication such that content that is not yet approved is prevented from being used.

In some embodiments, workflow module 114 may communicate one or more status updates as the workflow item progresses through its lifecycle. The status updates may be communicated to interested parties such as the requester, the resolver, and/or other interested parties. In some embodiments, workflow module 114 may use unified message module 113 to communicate the workflow item update as a message. As such, status updates may be communicated via messages based on templates that are suited for workflow item status updates.

In some embodiments, workflow module 114 may facilitate identification of particular content for use by the entity by allowing the entity to rank or otherwise identify particular content or content creators who create interesting content. For example, continuing the non-limiting example above, a reporter may flag favorite ones of content creators (e.g., social media users who post content) that the reporter believes creates or posts interesting content. Workflow module 114 may store an association of content creators and the reporter such that content from the flagged content creators may be highlighted or otherwise emphasized to the reporter. Such highlighting/emphasis may include displaying content from the flagged content creators at the top of a list, including graphical elements that emphasize the content, and/or other highlighting/emphasis.

In some embodiments, workflow module 114 may be configured to annotate the content with proprietary or otherwise private information, which may be provided by the entity during the course of managing the content with respect to the workflows. Workflow module 114 may store annotation information in association with the identifier that identifies the content. In this manner, users may provide annotations related to the content that may be stored for later retrieval. In some embodiments, the annotations may include internal comments (e.g., "this is a good photo posted by a user") made within an organization in relation to the content.

For example, a reporter may be interested in content from a content creator and establish communication with the content creator such as by using unified message module 113. The content creator may provide the reporter with a phone number or other information so that the reporter may contact the content creator at a later time. The reporter may provide the phone number, a meeting time, and/or other information as an annotation to the content. Other information, such as a text or audio transcription of the interview, interview notes, and/or other information may be provided as an annotation as well. Workflow module 114 may store the annotation information in association with the content. In some embodiments, access to the annotation information may be restricted using user roles and/or other security information. In this manner, entities such as news services and/or others may provide annotations that may be secure and private in relation to content using workflow module 114.

The use of content may be subject to various requirements such as permission requirements, attribution requirements, and/or other requirements. The requirements may be related to ownership rights associated with the content such that different owners may impose one or more different requirements for using the content.

In some embodiments, clearinghouse module 115 may be configured to manage the requirements, compliance with the requirements, payments, and/or other information related to the requirements. Clearinghouse module 115 may store an association of the content (e.g., the identifier that identifies the content) with an indicator that indicates whether the content is clear to use (e.g., one or more requirements of the content has been satisfied). In this manner, a user may view the content and determine whether the content may be used.

In some embodiments, clearinghouse module 115 may store an association of the content with the one or more requirements and display the requirements. For example, using clearinghouse module 115, a user may view the requirements associated with the content to determine what, if anything, is required in order to use the content.

In some embodiments, clearinghouse module 115 may facilitate messages to owners of the content to obtain permission to use the content. The authorization may include consent to use the content, consent to use the content with attribution, consent to use the content with payment of a fee, a sale of the content for a fee, and/or other authorization to use the content. Clearinghouse module 115 may store the request, consent, non-consent, various communications to and from the owners of the content, and/or other information related to authorization to use the content.

By storing whether content requires permission to use and/or whether such permission has been granted with respect to the content, clearinghouse module 115 may facilitate a database of content that has been permitted to be used. Clearinghouse module 115 may leverage permission information, geo-location information associated with the content, keyword information, and/or other information known to the system to build a robust and searchable clearinghouse database of content that may be permissibly used and/or licensed to others. For example, a news agency or others who wish to obtain content such as photographs related to a particular geo-location may obtain such content from the clearinghouse database. Thus, content related to rioting in a particular geo-location and obtained from social media and other providers may be found and/or licensed for use from the clearinghouse database.

In some embodiments, for example, clearinghouse module 115 may be configured to receive a request for content. For example, the request for content may include a search query run on the clearinghouse database and having one or more parameters that specify the search for content. The parameters may include a location parameter, a subject matter parameter, a permission parameter, and/or other parameters. For example, the location parameter may be used to specify one or more geo-locations of interest such that social media and/or other content related to the geo-locations of interest may be returned in the search results. The subject matter parameter may be used to specify one or more subject matter of interest such that social media and/or other content related to the subject matter of interest may be returned in the search results. Subject matter may be determined based on keywords of the content, hashtags, and/or other information related to the content. The permission parameter may be used to filter in or out the content based on whether the content is permitted to be used. Other parameters may be used as well.

Clearinghouse module 115 may identify at least one content item based on the request for content, which may be subject to one or more requirements. Clearinghouse module 115 may obtain and communicate the one or more requirements. The requester may review the requirements and decide that the requirements are acceptable (e.g., the requester is willing to satisfy the requirements in exchange for permission to use the content item). As such, clearinghouse module 115 may receive an indication that the one or more requirements are satisfactory and that the content item is desired. Clearinghouse module 115 may facilitate provision of the at least one content item and satisfaction of the one or more requirements. For example, clearinghouse module 115 may provide the content item from a memory (e.g., when the content item is stored by the system) and/or from the one or more content providers 150.

In some embodiments, clearinghouse module 115 may facilitate payment of a fee to use the at least one content item to thereby facilitate satisfaction of the one or more requirements. For example, the payment may include a one-time payment, a recurring payment, a payment based on use of the content, and/or other payment. Payments may be facilitated via one or more accounts related to clearinghouse module 115, conventional electronic payments, paper billing, and/or other payment methods. In this manner, clearinghouse module 115 may facilitate the use of content that may be otherwise subject to ownership rights of the content.

In some embodiments, clearinghouse module 115 may provide an attribution notice to accompany the at least one content to thereby facilitate satisfaction of the one or more requirements.

In this manner, clearinghouse module 115 may provide a platform by which owners of content and parties wishing to use the content may use to engage one another and facilitate permission, payments, and/or other activities related to use of the content.

In some embodiments, administration module 116 may be configured to manage user accounts, set user roles such as security access roles, and/or perform other administrative operations. For example, the administration module may be used to define which users may generate messages using the unified message module, generate workflow items, view workflow items of others, annotate content, enter into agreements with respect to ownership rights of the content, and/or set other user roles.

In some embodiments, communication module 117 may be configured to share a geofeed via a content provider such as a social media provider, email, SMS text, and/or other communication channels. In some embodiments, the communication module may be configured to communicate a geofeed via various feeds such as Really Simple Syndication ("RSS") and ATOM feeds, a vanity Uniform Resource Locator ("URL") using a name of the geofeed (e.g., a name assigned by the content consumer), and/or other communication channels.

In some embodiments, the user interface module 118 may be configured to generate user interfaces that allow viewing and interaction with the geofeeds. For example, the user interface module may present various displays for sending/receiving messages, managing workflows, managing information related to ownership rights of the content, displaying geofeeds, requesting geofeeds, and/or otherwise displaying information related to the content.

Those having skill in the art will recognize that computer 110 and content consumer device 130 may each comprise one or more processors, one or more interfaces (to various peripheral devices or components), memory, one or more storage devices, and/or other components coupled via a bus. The memory may comprise random access memory (RAM), read only memory (ROM), or other memory. The memory may store computer-executable instructions to be executed by the processor as well as data that may be manipulated by the processor. The storage devices may comprise floppy disks, hard disks, optical disks, tapes, or other storage devices for storing computer-executable instructions and/or data.

One or more applications, including various modules, may be loaded into memory and run on an operating system of computer 110 and/or consumer device 130. In one implementation, computer 110 and consumer device 130 may each comprise a server device, a desktop computer, a laptop, a cell phone, a smart phone, a Personal Digital Assistant, a pocket PC, or other device.

Network 102 may include any one or more of, for instance, the Internet, an intranet, a PAN (Personal Area Network), a LAN (Local Area Network), a WAN (Wide Area Network), a SAN (Storage Area Network), a MAN (Metropolitan Area Network), a wireless network, a cellular communications network, a Public Switched Telephone Network, and/or other network.

Figure 2:
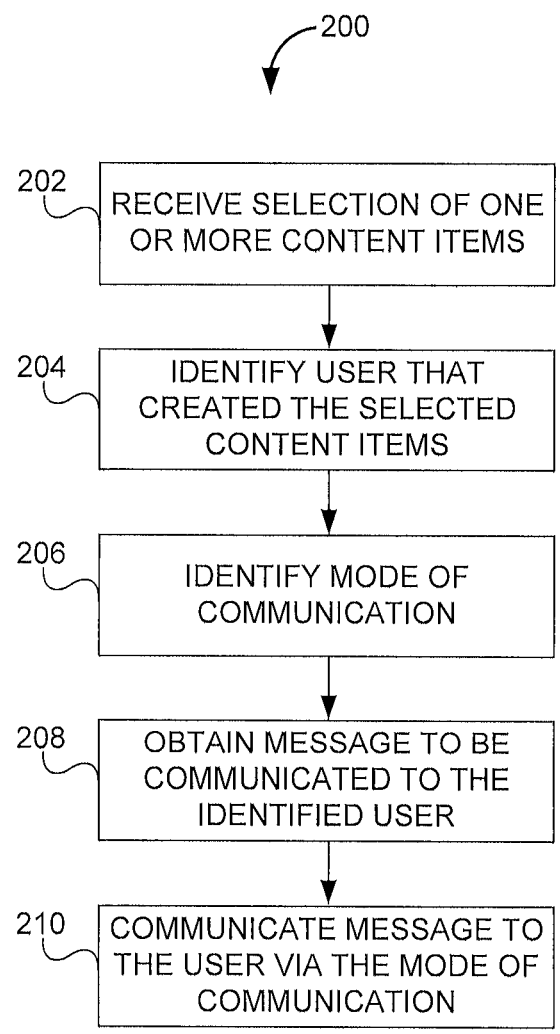
FIG. 2 illustrates a process of targeted messaging related to geofeeds, according to an aspect of the invention.

FIG. 2 illustrates a process 200 of targeted messaging related to geofeeds, according to an aspect of the invention. The various processing operations and/or data flows depicted in FIG. 2 (and in the other drawing figures) are described in greater detail herein. The described operations may be accomplished using some or all of the system components described in detail above and, in some embodiments, various operations may be performed in different sequences and various operations may be omitted. Additional operations may be performed along with some or all of the operations shown in the depicted flow diagrams. One or more operations may be performed simultaneously. Accordingly, the operations as illustrated (and described in greater detail below) are exemplary by nature and, as such, should not be viewed as limiting.

In an operation 202, a selection of one or more content items may be received. The one or more content items may be identified by an internal identifier (e.g., system-generated) and/or an external identifier (e.g., generated by a content provider). The selection may be received from a user viewing one or more geofeeds and selecting the one or more content items, from an automated process such as a process that selects the one or more content items based on keywords, and/or other source.

In an operation 204, a user that created the one or more content items may be identified. In an example where the one or more content items includes a TWEET, operation 204 may identify the user who generated the TWEET.

In an operation 206, a mode of communication may be identified. The mode of communication may include, for example, email, social media communication (e.g., a TWEET directed to a TWITTER handle), SMS text, and/or other mode of communication. In some embodiments, the mode of communication may be identified in various ways. For example, the mode of communication may be pre-defined by one or more rules specified by an entity that wishes to communicate targeted messages, be indicated by a user, and/or other method by which the mode of communication may be identified.

In an operation 208, a message to be communicated may be obtained. The message may be obtained from various message sources such as a user, one or more message rules (e.g., send a coupon to a user who TWEETS from a restaurant location), and/or other message source. In an operation 210, the message may be communicated to the identified user via the identified mode of communication.

Process 200 may be used to automatically and/or manually target messages to users who create content (e.g., post social media or other content that is relevant to a geo-location). In this manner, an entity may target messages to the users based on the content. The messages may serve various purposes such as, for example, requesting authorization to use the content, requesting the user to provide additional content (e.g., the user is at a location where breaking news is occurring and the message requests additional content), providing one or more promotional messages based on the content, and/or other providing other information based on the content.

Figure 3:
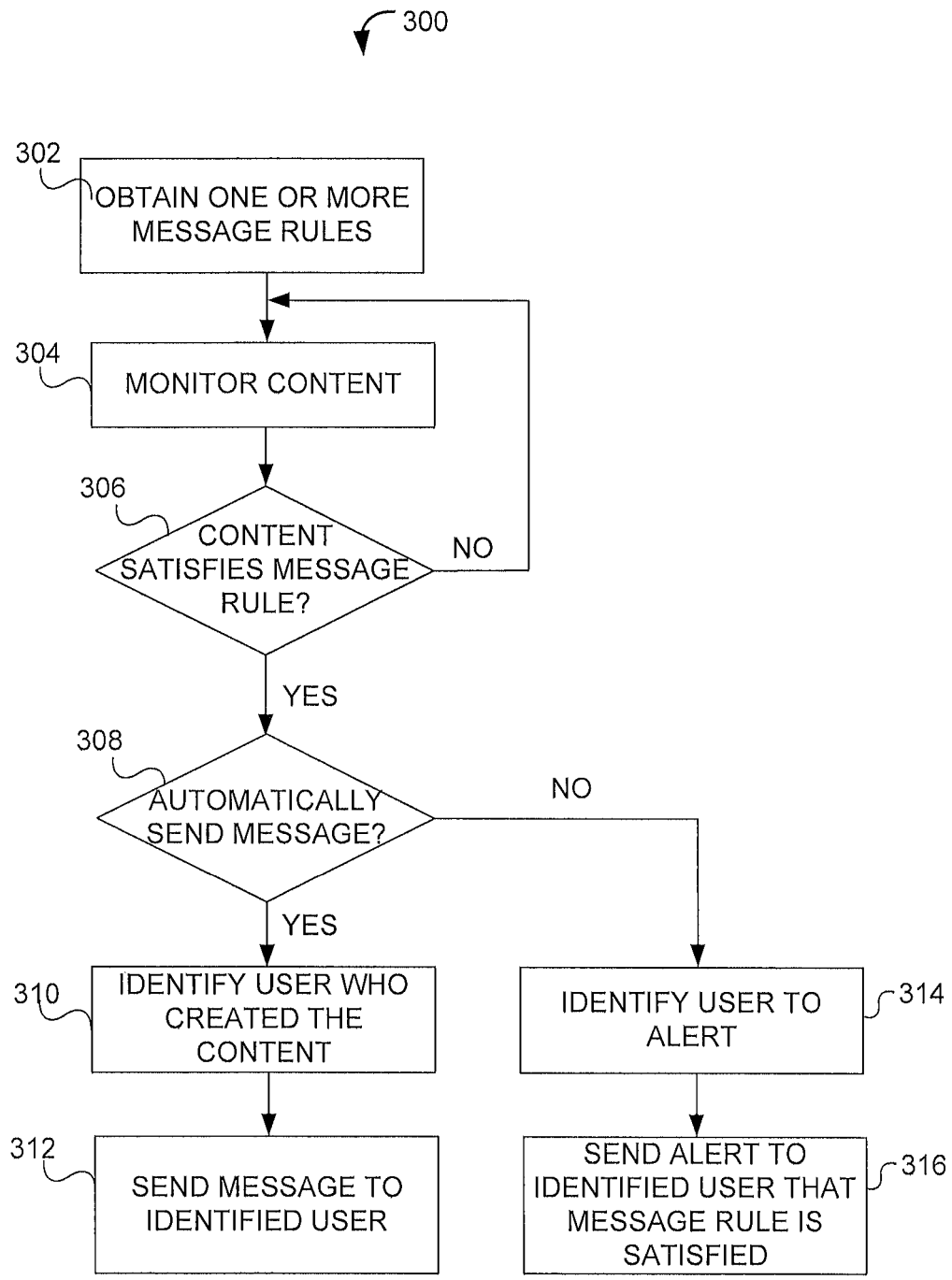
FIG. 3 illustrates a process of automated messaging related to geofeeds, according to an aspect of the invention.

FIG. 3 illustrates a process 300 of automated messaging related to geofeeds, according to an aspect of the invention. In an operation 302, one or more message rules may be obtained. In an operation 304, content may be monitored. For example, an entity may create one or more geofeed definitions that include one or more parameters that specify that the one or more geofeeds should be monitored for automatic messaging. The content related to such geofeed definitions may be obtained "live" from one or more content providers and monitored and/or stored and monitored.

In an operation 306, a determination of whether the monitored content satisfies the one or more message rules may be made. For example, a message rule may indicate that an automated message should be communicated to users who TWEET or otherwise provide content from a particular location. In another example, a message rule may indicate that an automated message should be communication to users who provide content that includes certain keywords. Other message rules may be used as well. In some embodiments, the one or more message rules may specify whether to automatically send a message when the content satisfies the message rules, specify the content of the messages, specify who should receive alerts related to the messages, and/or other information related to the message.

When the obtained content does not satisfy the message rules, processing may return to operation 304, where content is monitored. On the other hand, when the obtained content satisfies the message rules, a determination of whether to automatically send a message may be made in an operation 308.

When an automated message is to be sent, the user who created the content that satisfies the one or more message rules may be identified in an operation 310. In an operation 312, the message may be communicated to the identified user.

Returning to operation 308, when a message is not to be automatically sent, a user who should receive an alert that the message satisfied the one or more message rules may be identified in an operation 314. In an operation 316, an alert to the identified user may be communicated via one or more communication channels.

Figure 4:
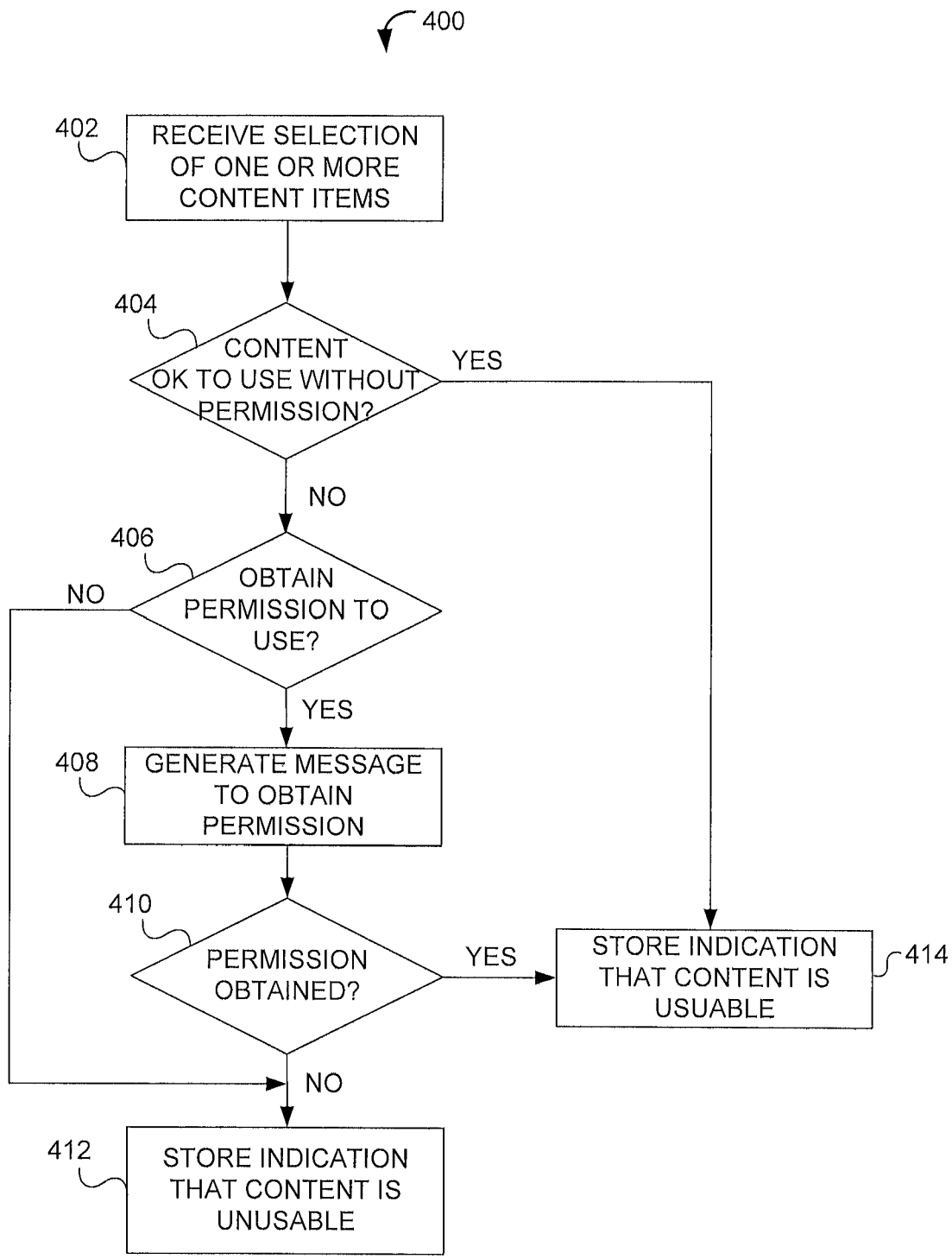
FIG. 4 illustrates a process of managing permission to use content, according to an aspect of the invention.

FIG. 4 illustrates a process 400 of managing permission to use content, according to an aspect of the invention. In an operation 402, a selection of one or more content items may be received. The one or more content items may be identified by an internal identifier and/or an external identifier. The selection may be received from a user, an automated process, and/or other source.

In an operation 404, a determination of whether permission is required prior to using (e.g., publishing) the selected content items may be made. When the content items may be used without permission, an indication that the content items are usable may be stored in an operation 414.

When the content may not be used without permission, a determination of whether to obtain permission to use the content may be made in an operation 406. When permission to use the content should not be obtained, an indication that the content items are unusable may be stored in an operation 412. Returning to operation 406, when permission to use the content should be obtained, a message to obtain the permission may be generated in an operation 408. For example, an owner of or other holder of rights to the content may be identified and a message to the owner that requests permission to use the content may be generated.

In an operation 412, a determination of whether permission has been obtained may be made. For example, the owner of the content may provide permission to use the content. If permission has not been obtained (e.g., permission has been denied), an indication that the content is unusable may be stored in operation 412. If permission has been obtained, an indication that the content is usable may be stored in operation 414.

Process 400 may be used to ensure that permissions with respect to using content is verified and obtained when such permission may be necessary. The usable and unusable indicators may be used to verify that use of such content is permitted before publishing or otherwise using the content. For example, prior to content being published, the usable and/or unusable indicator (which may be stored in one or more fields of a database, for example) may be referenced to determine whether the content may be published without potentially overstepping use rights (e.g., copyright) related to the content. In some embodiments, the indicators may be automatically and/or manually maintained.

Figure 5:
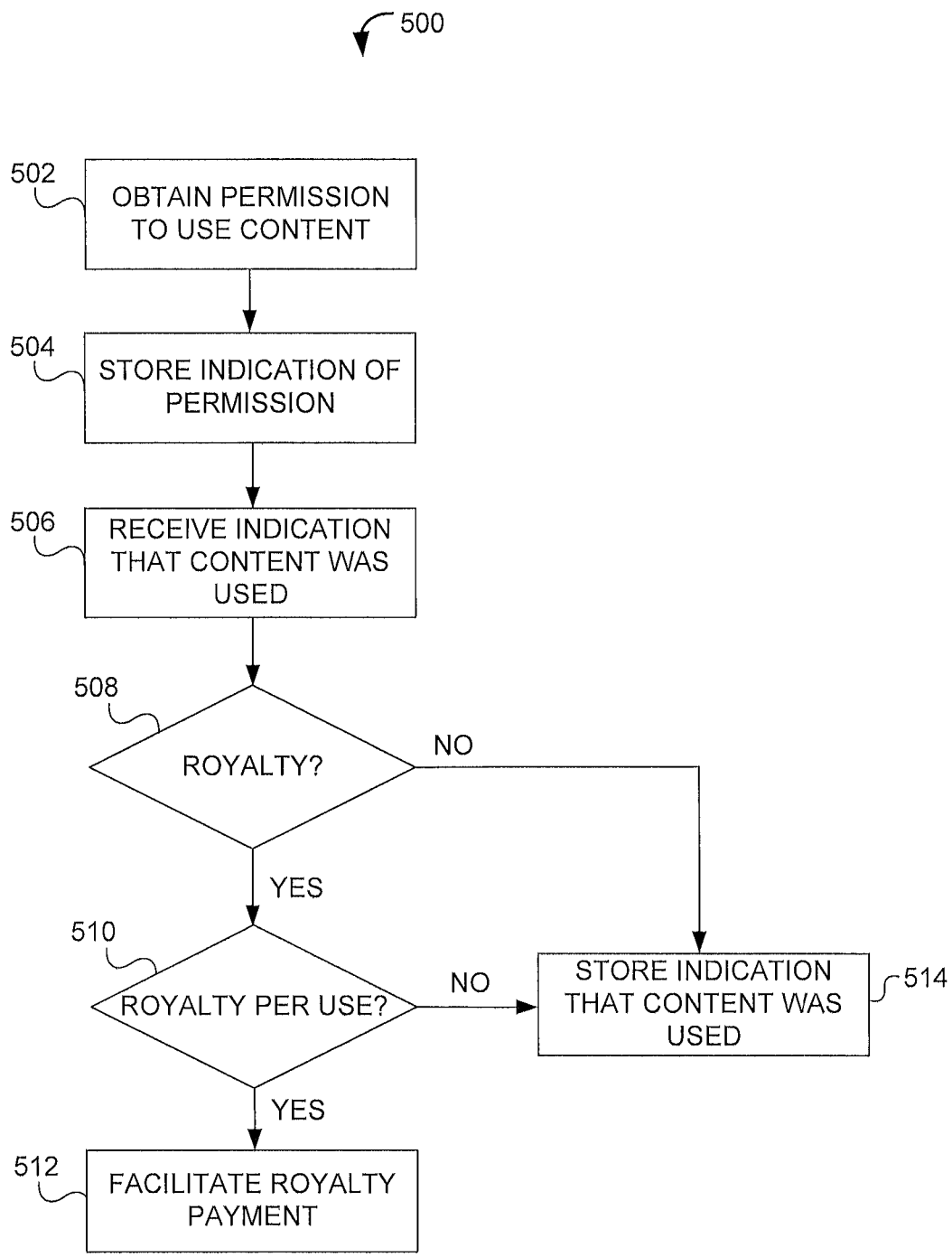
FIG. 5 illustrates a process of managing payments related to use of content, according to an aspect of the invention.

FIG. 5 illustrates a process 500 of managing payments related to use of content, according to an aspect of the invention. In an operation 502, an indication that content is permitted may be obtained. In an operation 504, the indication may be stored. In an operation 506, an indication that the content was used may be received. In an operation 508, a determination of whether a royalty or payment is associated with the use may be made. When a royalty is not associated with the use, an indication of the use may be stored in an operation 514. The indication may be stored solely for informational purposes. When a royalty is associated with the use, a determination of whether the royalty is related to a royalty per use may be made. When the royalty is not a per use royalty (e.g., a lump sum payment was made in exchange for permission to use the content), an indication of the use may be stored in operation 514.

When the royalty include a per use royalty, a royalty payment for the use may be facilitated in an operation 512. For example, a royalty fee based on the use may be determined. In some embodiments, the royalty fee may be determined based on a count of the number of uses of the content in a time period and a per use fee associated with the content. In some embodiments, process 500 may facilitate various payment methods from the user of the content to the holder of rights of the content, whether the royalty is a lump sum fee, per use fee, and/or other type of fee arrangement.

Figure 6:
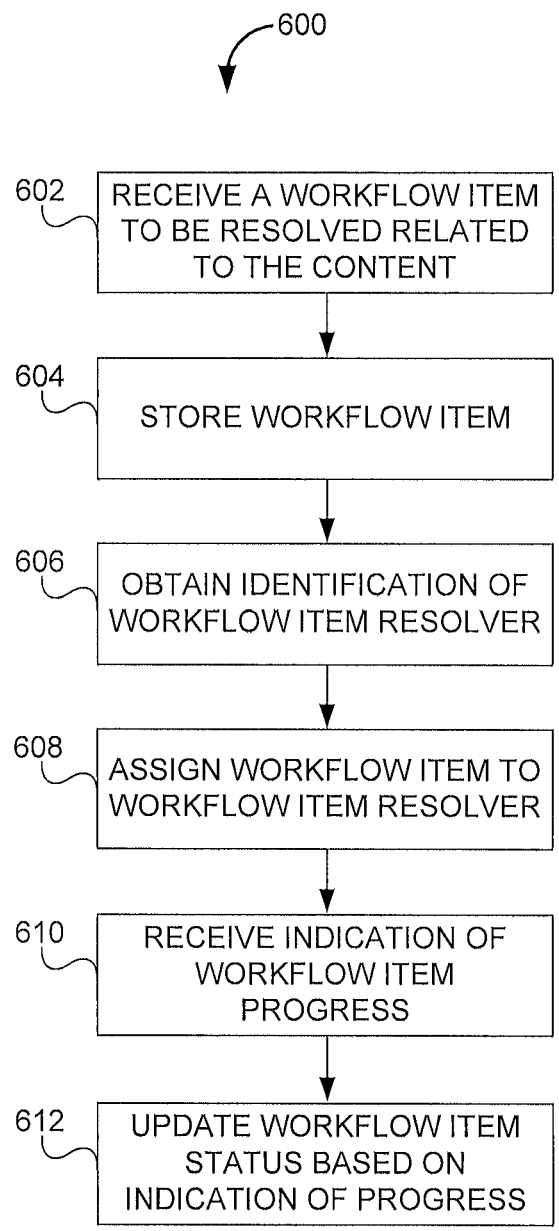
FIG. 6 illustrates a process of managing workflows related to geofeeds, according to an aspect of the invention.

FIG. 6 illustrates a process 600 of managing workflows related to geofeeds, according to an aspect of the invention. In an operation 602, a workflow item request for a workflow item to be resolved in relation to content may be received. In an operation 604, the workflow item may be generated and stored. For example, the workflow item may be assigned with a workflow item identifier and the workflow item identifier may be stored in association with a workflow item description, a workflow item type, a date, a workflow item status, a requester, a resolver, and/or other information related to the workflow item.

In an operation 606, an identification of a resolver may be obtained. In some embodiments, the requester and the resolver may be the same or different user. The identification may be obtained from the workflow item request (e.g., the requester may specify who should handle the workflow item), automatically obtained based on user roles, user relationships, or other information, and/or from other information sources. In an operation 608, the workflow item may be assigned to the identified resolver. In some embodiments, an indication of the progress of the workflow item may be received in an operation 610. The indication of the progress may be received from the requester, the resolver, an automated process that monitors the workflow item, and/or other source of information. In an operation 612, the workflow item status may be updated based on the indication of progress.

In some embodiments, process 600 may include communicating information to the requester, the resolver, and/or others. The information may relate to a progress of the workflow item (e.g., status updates), information relevant to the workflow item, and/or other information.

Figure 7:
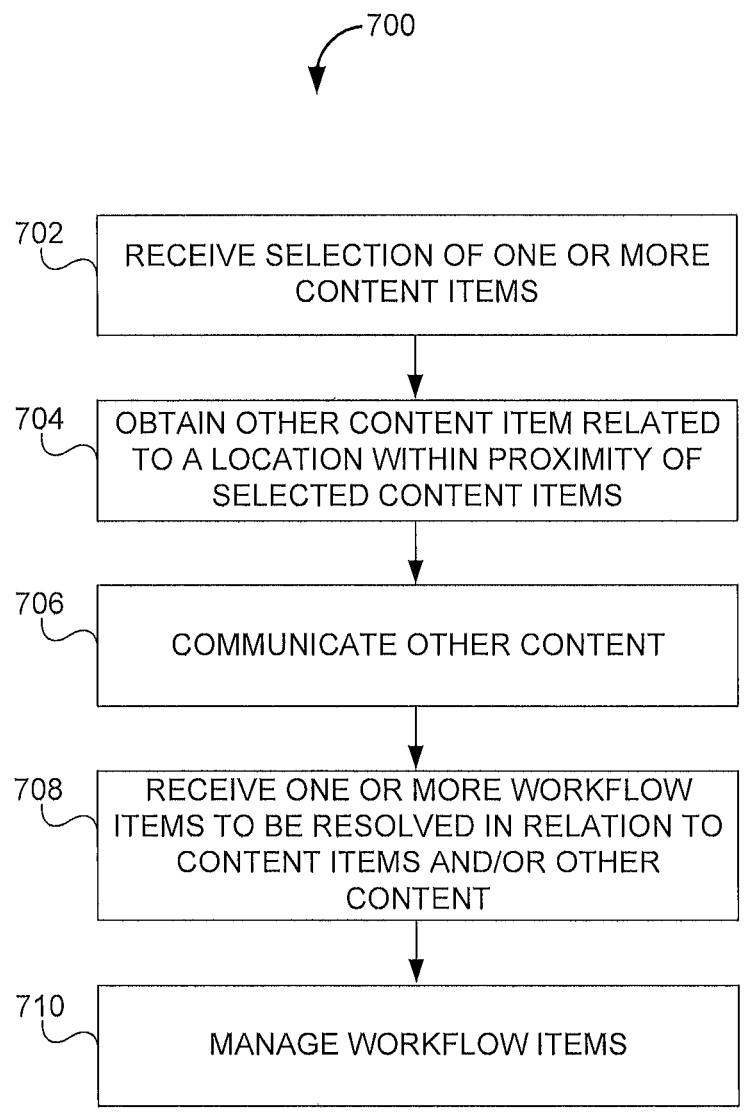
FIG. 7 illustrates a process of identifying content to be managed in a workflow, according to an aspect of the invention.

FIG. 7 illustrates a process 700 of identifying content to be managed in a workflow, according to an aspect of the invention. In an operation 702, a selection of one or more content items may be received. The one or more content items may be identified by an internal identifier and/or an external identifier. The selection may be received from a user, an automated process, and/or other source.

In an operation 704, proximate content related to a location within a predefined or otherwise configurable proximity of a location related to the selected content items may be obtained. For example, for a selected content item that is relevant to a geo-location, proximate content within a five mile radius or other proximity may be obtained. In this manner, process 700 facilitates using particular content items of interest to potentially discover other related content items of interest.

In an operation 706, the proximate content may be communicated. For example, the proximate content may be communicated via a display and/or other communication channels. In an operation 708, one or more workflow items to be resolved in relation to the content items and/or the proximate content items may be received. In an operation 710, the one or more workflow items may be managed, such as in a manner similar to process 600.

Figure 8:
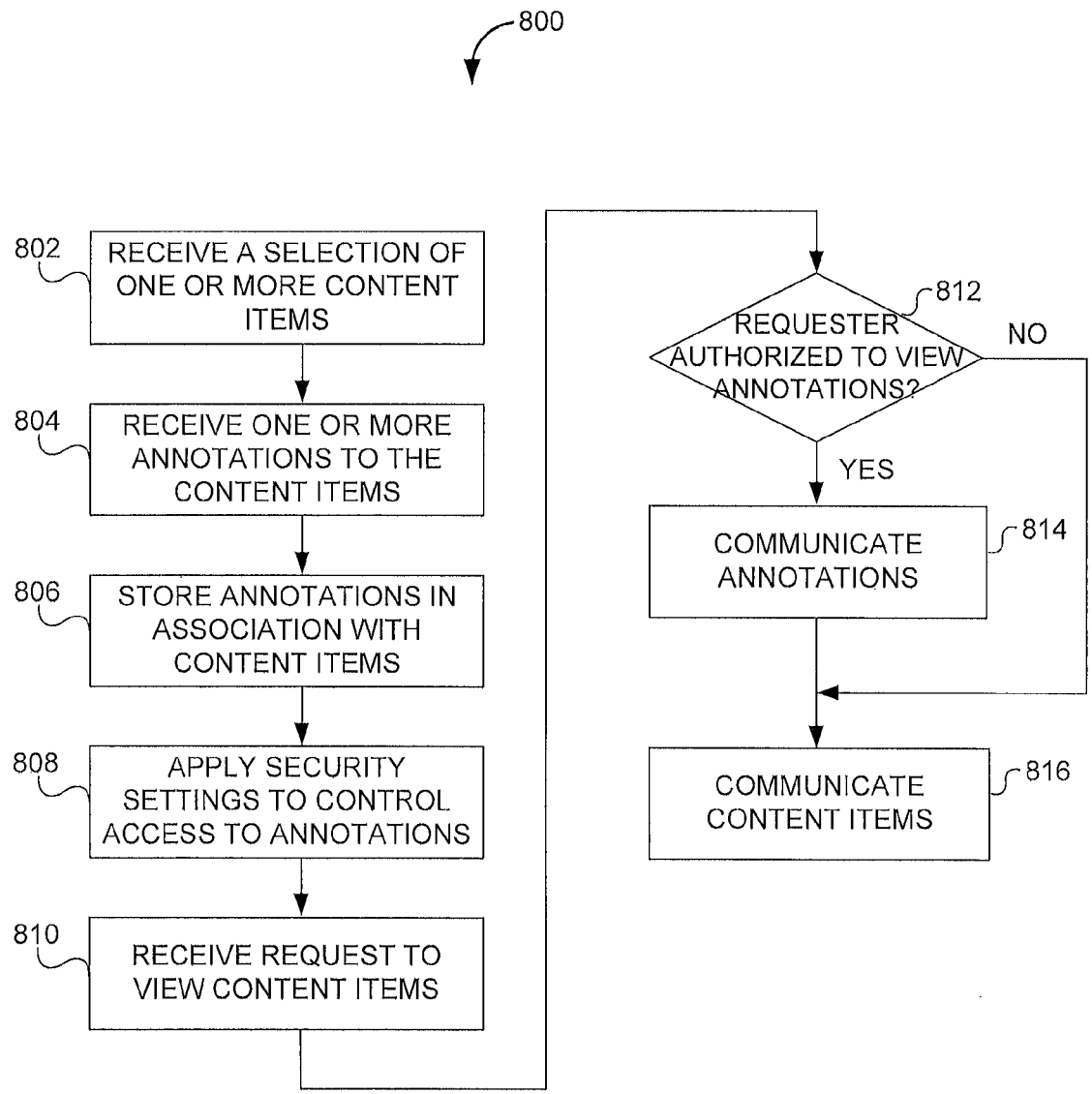
FIG. 8 illustrates a process of annotating content of a geofeed, according to an aspect of the invention.

FIG. 8 illustrates a process 800 of annotating content of a geofeed, according to an aspect of the invention. In an operation 802, a selection of one or more content items may be received. The one or more content items may be identified by an internal identifier and/or an external identifier. The selection may be received from a user, an automated process, and/or other source.

In an operation 804, one or more annotations to the selected content items may be received. The one or more annotations may include information added to the selected content items (and/or updates or removal of information from the selected content items). Typically although not necessarily, the annotations may facilitate internal workflows. For example, a reporter may annotate a TWEET with a user's phone number that the reporter obtained. Process 800 may receive such annotations for processing.

In an operation 806, the one or more annotations may be stored in association with the selected content items. In an operation 808, one or more security settings may be applied to control access to the one or more annotations. For example, the security settings may restrict access (e.g., read, write, delete, and/or other types of access) to the annotations to only a user who made the annotations, particular users of an entity, users having particular user roles, and/or other users.

In an operation 810, a request to view the content items may be received. In an operation 812, a determination of whether the requester is authorized to access the annotations made be made. When the requester is authorized to access the annotations, the annotations may be communicated in an operation 814 and the content items may be communicated in an operation 816. When the requester is not authorized to access the annotations, only the content items may be communicated in operation 816.

Figure 9:
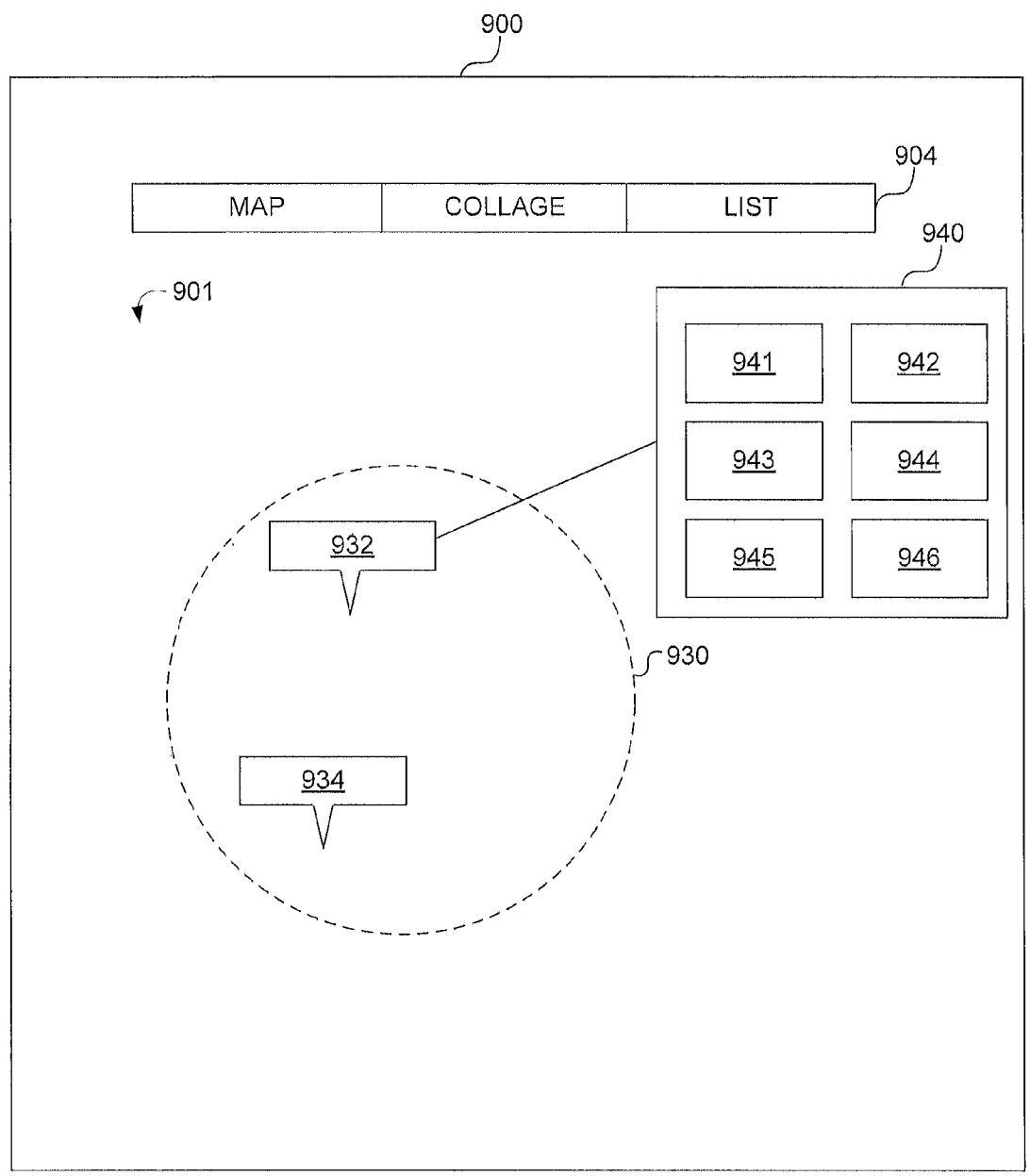
FIG. 9 illustrates a screenshot of an interface for displaying content items with access to targeted messaging, workflows, and rights management, according to an aspect of the invention.

FIG. 9 illustrates a screenshot of an interface 900 for displaying content items with access to targeted messaging, workflows, and rights management, according to an aspect of the invention. The screenshots illustrated in FIG. 9 are for illustrative purposes only. Various components may be added, deleted, moved, or otherwise changed so that the configuration, appearance, and/or content of the screenshots may be different than as illustrated in the figures. Accordingly, the graphical user interface objects as illustrated (and described in greater detail below) are exemplary by nature and, as such, should not be viewed as limiting.

Interface 900 may be implemented as a web page communicated from computer 110 to a client, an application such as a mobile application executing on the client that receives generates the interface based on information communicated from computer 110, and/or other interface. Whichever type of interface is used, computer 110 may communicate the data and/or formatting instructions related to the interface to the client, causing the client to generate the interface of FIG. 9 and other drawing figures. Furthermore, computer 110 may receive data from the client via the various interfaces, as would be appreciated.

To switch between the different views of geofeeds, a navigation element 904 having links or other controls that switch between the "MAP" display illustrated in FIG. 9, a "COLLAGE" display, and a "LIST" display.

The geofeed as illustrated (bounded by circle 930) includes content indicators 932 and 634, which provide graphical indicia of aggregated content of the geofeed. The content may be provided from different or the same content provider. Content indicators 932 and 934 may each include an icon, a logo, and/or other identifying indicia that indicates the source of the content and/or a type of content. As illustrated, when content indicator 932 is selected (e.g., moused over, clicked, touched, or otherwise interacted with) interface 900 may cause workflow interface 940 to appear. Workflow interface 940 may include a component 941 that includes information related to the content such as, for example, the content itself, a content creator (e.g., social media user who posted the content), an identification of the content provider that provided the content, a time associated with the content (e.g., create time, publication time, etc.), a location where the content was created (e.g., address, geo-coordinates, etc.), and/or other information known or determined about the content.

In some embodiments, component 942 may include an interface or links to an interface that provides targeted messaging functions. For example, using component 942, a targeted message may be directed to the content creator associated with the content indicated by content indicator 932.

In some embodiments, component 943 may include an interface or links to an interface that provides digital rights or other functions relation to permission to use content. For example, using component 943, whether content indicated by content indicator 932 is permitted to be used in an entity's website may be determined. If such permission is required and not yet obtained, component 943 may be used to obtain such permission.

In some embodiments, component 944 may include an interface or links to an interface that provides workflow functions. For example, using component 944, various workflow items related to the content indicated by content indicator 932 may be generated and tracked. Other components 945 related to other features related to the content indicated by content indicator 932 may be provided as well.

Other embodiments, uses and advantages of the invention will be apparent to those skilled in the art from consideration of the specification and practice of the invention disclosed herein. The specification should be considered exemplary only, and the scope of the invention is accordingly intended to be limited only by the following claims.

What is claimed is:

1. A system of targeted messaging based on content items from one or more of a plurality of content providers, the system comprising:
   a memory configured to store computer-executable instructions; and
   one or more processors programmed with the computer-executable instructions that, when executed by the one or more processors, program the one or more processors to:
   obtain (i) a first set of social media content items from a first social media content provider based on a first request that is formatted in a first format specifically for the first social media content provider, and (ii) a second set of social media content items from a second social media content provider based on a second request that is formatted in a second format specifically for the second social media content provider, wherein the first format is different than the second format;
   identify a geo-location at which at least a first content item, from among the first set of social media content items or the second set of social media content items, was created;
   identify a first user that created the first content item based on a social media account through which the first content item was posted by the user;
   determine that the geo-location at which the first content item was created corresponds to a retail location of a retailer;
   identify one or more promotions related to the retailer location and/or the retailer;
   generate one or more targeted messages to be communicated to the first user responsive to the determination that the geo-location at which the first content item was created corresponds to the retail location of the retailer, wherein the one or more targeted messages comprise the one or more promotions; and
   cause the one or more targeted messages to be communicated to the first user that created the first content item via a user device associated with the first user.

2. The system of claim 1, wherein the one or more processors are further programmed to:
   cause the one or more targeted messages to be communicated to the social media account of the first user.

3. The system of claim 1, wherein the one or more targeted messages include a request to the identified user to provide additional content, and wherein the one or more processors are further programmed to:
   receive from the first user the additional content.

4. The system of claim 1, wherein the one or more processors are further programmed to:
store an exchange of communications to and from the first user; and
provide the stored exchange of communications.

5. The system of claim 1, wherein at least one of the one or more targeted messages comprises a poll, and wherein to cause the one or more targeted messages to be communicated to the first user, the one or more processors are further programmed to:
broadcast a poll to the first user, the poll including questions that prompt for additional information relating to the first content item or the geo-location at which the first content item was created.

6. The system of claim 1, wherein the one or more processors are further programmed to:
obtain a message template from among a plurality of message templates, wherein the message template includes at least one formatting instruction; and
generate the one or more targeted messages based on the message template.

7. The system of claim 6, wherein the plurality of message templates correspond to individual ones of types of messages to be communicated.

8. The system of claim 1, wherein the one or more processors are further programmed to:
identify one or more keywords from the first content item; and
determine a topic based on the one or more keywords, wherein the one or more promotions are identified based on the topic.

9. The system of claim 1, wherein the one or more processors are further programmed to:
identify a registered user other than the first user who created the first content item; and
cause the one or more targeted messages to be communicated to the registered user.

10. A method of providing targeted messaging based on content items from one or more of a plurality of content providers, the method being implemented in a computer that includes a memory configured to store computer-executable instructions and one or more processors programmed with the computer-executable instructions, the method comprising:
obtaining, by the one or more processors, (i) a first set of social media content items from a first social media content provider based on a first request that is formatted in a first format specifically for the first social media content provider, and (ii) a second set of social media content items from a second social media content provider based on a second request that is formatted in a second format specifically for the second social media content provider, wherein the first format is different than the second format;
identifying, by the one or more processors, a geo-location at which at least a first content item, from among the first set of social media content items or the second set of social media content items, was created;
identifying, by the one or more processors, a first user that created the first content item based on a social media account through which the first content item was posted by the first user;
determining, by the one or more processors, that the geo-location at which the first content item was created corresponds to a retail location of a retailer;
identifying, by the one or more processors, one or more promotions related to the retailer location and/or the retailer;
generating, by the one or more processors, one or more targeted messages to be communicated to the first user responsive to the determination that the geo-location at which the first content item was created corresponds to the retail location of the retailer, wherein the one or more targeted messages comprise the one or more promotions; and
causing, by the one or more processors, the one or more targeted messages to be communicated to the first user that created the first content item via a user device associated with the first user.

11. The method of claim 10, the method further comprising:
causing, by the one or more processors, the one or more targeted messages to be communicated to the social media account of the first user.

12. The method of claim 10, wherein the one or more targeted messages include a request to the identified user to provide additional content, the method further comprising:
receiving, by the one or more processors, from the first user the additional content.

13. The method of claim 10, the method further comprising:
storing, by the one or more processors, an exchange of communications to and from the first user; and
providing, by the one or more processors, the stored exchange of communications.

14. The method of claim 10, wherein at least one of the one or more targeted messages comprises a poll, and wherein causing the one or more targeted messages to be communicated to the first user comprises:
broadcasting, by the one or more processors, a poll to the first user, the poll including questions that prompt for additional information relating to the first content item or the geo-location at which the first content item was created.

15. The method of claim 10, the method further comprising:
obtaining, by the one or more processors, a message template from among a plurality of message templates, wherein the message template includes at least one formatting instruction; and
generating, by the one or more processors, the one or more targeted messages based on the message template.

16. The method of claim 15, wherein the plurality of message templates correspond to individual ones of types of messages to be communicated.

17. The method of claim 10, the method further comprising:
identifying, by the one or more processors, one or more keywords from the first content item; and
determining, by the one or more processors, a topic based on the one or more keywords, wherein the one or more promotions are identified based on the topic.

18. The method of claim 10, the method further comprising:
identifying, by the one or more processors, a registered user other than the first user who created the first content item; and
causing, by the one or more processors, the one or more targeted messages to be communicated to the registered user.

* * * * *